(12) United States Patent
Willke

(10) Patent No.: US 6,813,767 B1
(45) Date of Patent: Nov. 2, 2004

(54) PRIORITIZING TRANSACTION REQUESTS WITH A DELAYED TRANSACTION RESERVATION BUFFER

(75) Inventor: Theodore L. Willke, Tacoma, WA (US)

(73) Assignee: Intel Corporation, Santa Clara, CA (US)

(*) Notice: Subject to any disclaimer, the term of this patent is extended or adjusted under 35 U.S.C. 154(b) by 591 days.

(21) Appl. No.: 09/608,876

(22) Filed: Jun. 30, 2000

(51) Int. Cl.[7] .............................................. G06F 12/00
(52) U.S. Cl. .................. 718/101; 718/103; 710/112; 710/113; 710/126; 710/107
(58) Field of Search .................. 709/100, 101, 709/102, 103, 104; 711/147, 150, 151, 145; 718/100, 101, 103; 710/36, 39, 107, 112, 113, 126

(56) References Cited

U.S. PATENT DOCUMENTS

| | | | | |
|---|---|---|---|---|
| 5,615,343 A | * | 3/1997 | Sarangdhar et al. ........ 710/112 |
| 5,860,159 A | * | 1/1999 | Hagersten ................... 711/151 |
| 5,937,171 A | * | 8/1999 | Sarangdhar et al. ........ 710/105 |
| 5,958,019 A | * | 9/1999 | Hagersten et al. .......... 709/400 |
| 5,983,326 A | * | 11/1999 | Hagersten et al. .......... 711/147 |
| 6,012,118 A | * | 1/2000 | Jayakumar et al. ......... 710/107 |
| 6,108,735 A | * | 8/2000 | Pawlowski .................. 710/107 |
| 6,247,102 B1 | * | 6/2001 | Chin et al. .................. 711/150 |
| 6,260,091 B1 | * | 7/2001 | Jayakumar et al. ......... 710/113 |
| RE38,388 E | * | 1/2004 | Sarangdhar et al. ........ 710/105 |

* cited by examiner

Primary Examiner—Majid A. Banankhah
(74) Attorney, Agent, or Firm—Blakely, Sokoloff, Taylor & Zafman LLP

(57) ABSTRACT

In one embodiment of the invention, a transaction queue stores a transaction request and issues a stream transaction for the stored transaction request when a slot in a set of active stream contexts becomes available. A token generator provides a token representative of a pre-fetched request. A queue selector transfers the transaction request to the transaction queue based on a selection condition.

40 Claims, 7 Drawing Sheets

PRIORITIZING TRANSACTION REQUESTS WITH A DELAYED TRANSACTION RESERVATION BUFFER

BACKGROUND

1. Field of the Invention

This invention relates to microprocessors. In particular, the invention relates to chipsets.

2. Description of Related Art

Advances in microprocessor technology has led to development of many high-performance chipsets with highly integrated architectures. Host bridge chipsets to interface to buses such as peripheral component interconnect (PCI) provide many advanced functionalities to support various platform configurations, including multi-master systems.

However, there are many applications that need efficient techniques to handle different types of transactions. These applications include phase-sensitive real time applications (e.g., variable bit rate multimedia or fixed rate audio), fiber channel disk controllers, or high performance network interface devices (e.g., Gigabit Ethernet). One difficulty with PCI is determining what packets require expedited service. High-performance disk reads and network frame transfers usually require lots of bandwidth. Devices supporting these functions usually have a mixture of memory access commands including short reads and burst transfer sequences. Existing chipsets do not provide support for this kind of transactional behavior.

Therefore, there is a need to have an efficient technique to handle transaction requests having different characteristics.

BRIEF DESCRIPTION OF THE DRAWINGS

The features and advantages of the present invention will become apparent from the following detailed description of the present invention in which.

DESCRIPTION

Figure 1:
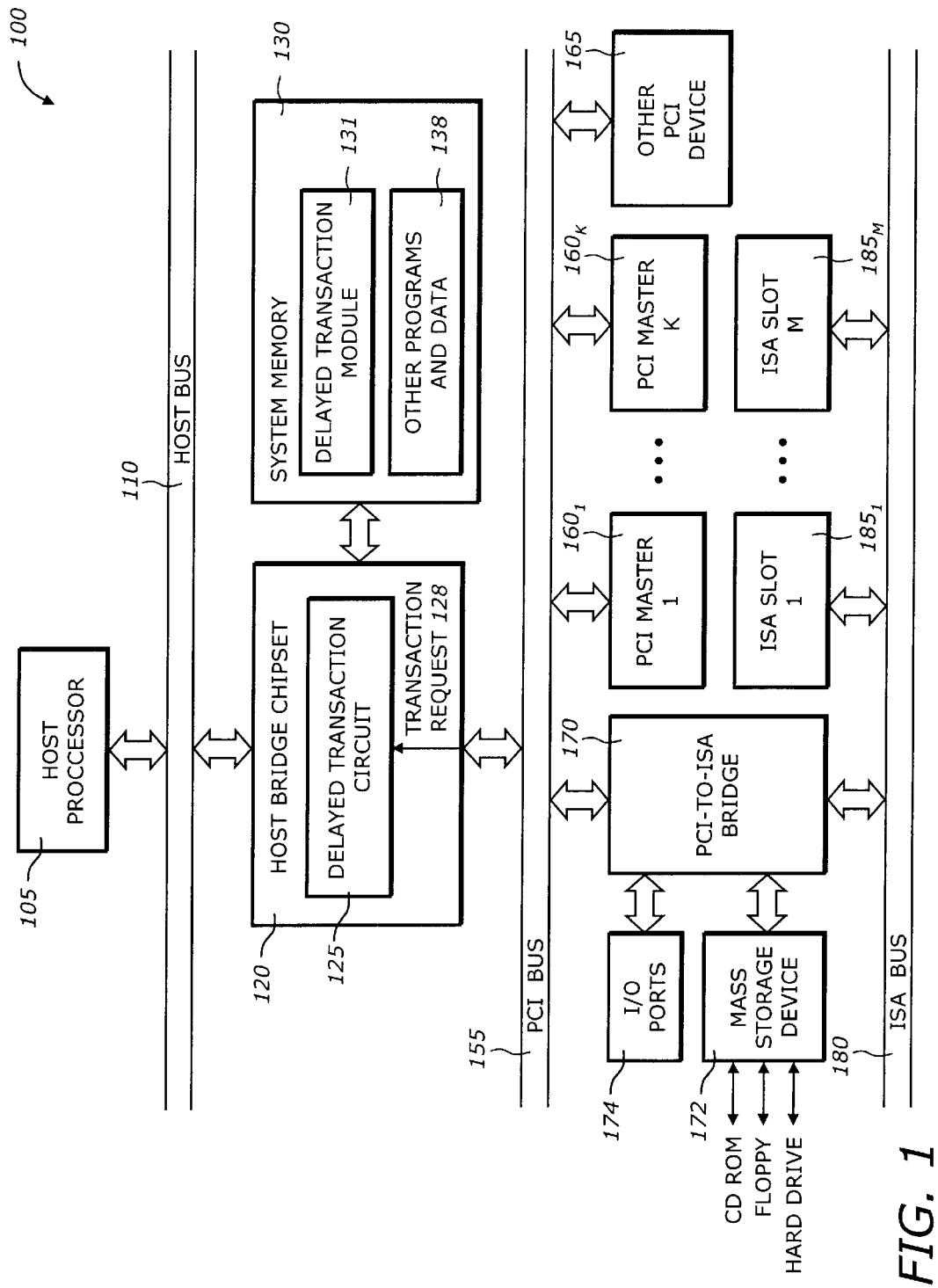
FIG. 1 is a diagram illustrating a system in which one embodiment of the invention can be practiced.

The present invention is a technique to prioritize transaction requests using a delayed transaction reservation buffer (DTRB). The technique is suitable for applications in peripheral component interconnect (PCI) host bridge components that emphasize inbound read performance. The prioritized DTRB circuit includes a transaction queue, a token generator, and a queue selector. The transaction queue stores a transaction request from a master and issues a stream transaction for the stored transaction request when a slot in a set of stream active contexts becomes available. The token generator provides a token representative of a pre-fetched request. The queue selector transfers the transaction request to the transaction queue based on a selection condition. The selection condition includes a token availability in the token generator and a classification of the transaction request.

The DTRB enables the host bridge to accept PCI read retry transaction information and store it prior to having buffer and other necessary transaction resources freed up. The main benefit of adding a reservation buffer to a bridge's inbound read logic is to hide some stream replacement latency incurred when one PCI master causes one of the bridge read stream resources to free up while another master has previously requested (and was retried) the read resource.

By enqueuing the transaction in the DTRB instead of dropping it, the bridge effectively de-couples PCI retry timing from stream context replacement timing. Thus, when a stream invalidation event occurs, an expander bus request for the new context will immediately issue regardless of the state of the PCI arbitration. Acceptance into the DTRB requires checking that the queue is not already full and that the candidate transaction is not issued by a master having an existing DTRB entry. The second criterion is optional but prevents aggressive cards from attempting to schedule multiple transactions at the expense of other masters. A look-up table containing all device request line numbers associated with transactions in the DTRB is maintained to support this criterion.

Prioritizing the DTRB further enhances the device performance, especially when there is a mixture of normal and priority classes of transaction requests. Advantages of the technique include:

1) Hides some degree of PCI retry latency for one or more expander bus requests.
2) Provides a PCI command-dependent transaction prioritization scheme that benefits devices such as Gigabit Ethernet adapters and Fiber Channel disk controllers by improving direct memory access (DMA) setup time. By expediting control block fetching for these devices, the latency to first data and sustainable streaming throughout is improved.
3) Provides a token-bucket fairness scheme to throttle the priority queue group, which adapts well to several scenarios: (i) expedites control block fetching for data streaming DMA engine, (ii) enforces throughput sharing between devices that use the various PCI read commands such as memory-read-multiple (MRM), memory-read-line (MRL) and memory-read (MR) for primary data streaming, and (iii) can tune the command-based throughput sharing ratios and even force degenerate non-prioritized behavior.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

FIG. 1 is a diagram illustrating a computer system 100 according to one embodiment of the present invention. The computer system 100 may be used as part of the delivery subsystem 20 or the receiver subsystem 50. The computer system 100 includes a processor 105, a host bus 110, a host bridge chipset 120, a system memory 130, a peripheral component interconnect (PCI) bus 155, K PCI masters $160_1$ to $160_K$, other PCI devices 165, a PCI-to-industry standard adapter (ISA) bridge 170, mass storage devices 172, Input/Output (I/O) ports 174, an ISA bus 180, and ISA slots $185_1$ to $185_M$.

The processor 105 represents a central processing unit of any type of architecture, such as complex instruction set computers (CISC), reduced instruction set computers (RISC), very long instruction word (VLIW), or hybrid architecture. The processor 105 interfaces with the host bridge chipset 120 via the host bus 110. The host bus 110 may support single processor or multiple processors.

The host bridge chipset 120 includes a number of interface circuits to allow the host processor 105 access to the system memory 130 and the PCI bus 155. The host bridge chipset includes a delayed transaction circuit 125 to process PCI requests 128. The delayed transaction circuit 125 will be described later. The delayed transaction circuit 125 may be implemented by hardware or microcode or a combination of both. In addition, part or all of the delayed transaction may also be implemented by software. When part of the delayed transaction is implemented by software, the delayed transaction circuit 125 may contain software interface to interact with the programs. The system memory 130 represents one or more mechanisms for storing information. For example, the system memory 130 may include non-volatile or volatile memories. Examples of these memories include flash memory, read only memory (ROM), or random access memory (RAM). The system memory 130 may contain a delayed transaction module 131 and other programs and data 138. The delayed transaction module 131 may perform some or all of the operations in the prioritized delayed transactions. When the delayed transaction module 131 performs part of the operations, it interacts with the delayed transaction circuit 125 or an equivalent microcode to provide supporting software or drivers. Of course, the system memory 130 preferably contains additional software (not shown), which is not necessary to understanding the invention.

The PCI masters $160_1$ to $160_K$ are devices that are capable of becoming master of the PCI Examples of PCI. masters include direct memory access controller (DMAC), input/output processors (IOP), etc. Examples of other PCI devices 165 include network interface and media interface devices. The network interface connects to communication networks such as the Internet. The Internet provides access to on-line service providers, Web browsers, and other network channels. The media interface provides access to audio and video devices.

The PCI-to-ISA bridge 170 provides access to the ISA bus 180, mass storage devices 172, and I/O ports 174. The mass storage devices 172 include CD ROM, floppy diskettes, and hard drives. The ISA bus 180 has a number of ISA slots $185_1$ to $185_M$ to interface to ISA devices. Examples of ISA devices include data entry devices (e.g., keyboard, mouse), printers, etc.

When implemented in software or firmware (e.g., microcode), the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor or computer or machine readable medium" may include any medium that can store or transfer information such as the mass storage devices 172. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The delayed transaction module 131 may have several modules coupled to one another. Any of the components or circuits described in the following may be alternatively implemented partly or wholly by software or firmware, and these components or circuits may be implemented in software modules. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

Figure 2:
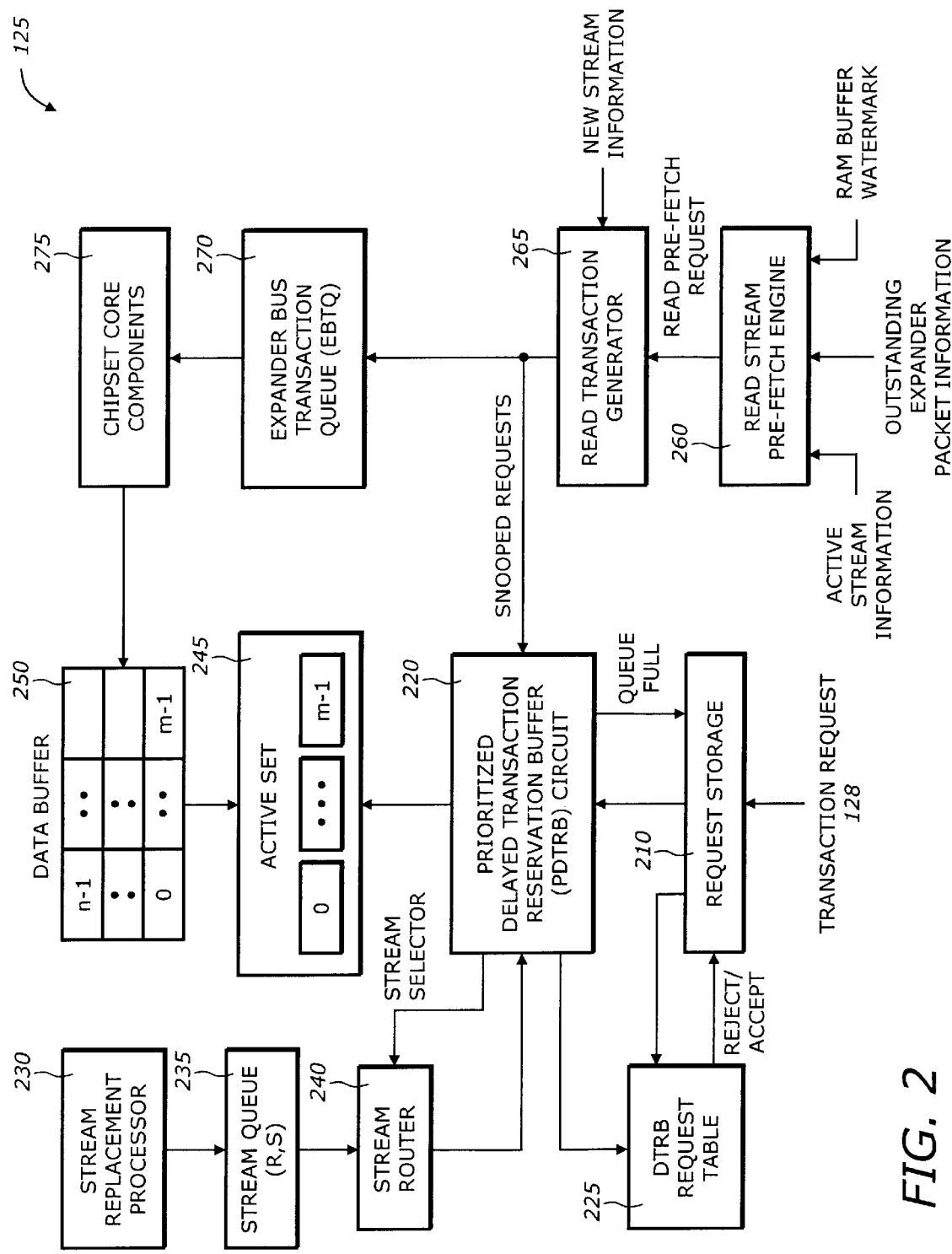
FIG. 2 is a diagram illustrating a delayed transaction circuit shown in FIG. 1 according to one embodiment of the invention.

FIG. 2 is a diagram illustrating the delayed transaction circuit 125 shown in FIG. 1 according to one embodiment of the invention. The delayed transaction circuit 125 includes a request storage 210, a prioritized delayed transaction reservation buffer (PDTRB) circuit 220, a delayed transaction reservation buffer (DTRB) request table 225, a stream replacement processor 230, a stream queue 235, a stream router 240, an active set 245, a data buffer 250, a read stream pre-fetch engine 260, a read transaction generator 265, an expander bus transaction queue (EBTQ) 270, and chipset core components 275.

The request storage 210 contains the PCI request 128 from PCI masters 1601 to 160K. A PCI master targets the host bridge's address range with a PCI read transaction and the host bridge chipset 120 captures the relevant transaction information (e.g., command, address, port size). The request storage 210 organizes the PCI request 128 into the request type, address references, and header information. The request goes to the DTRB request table 225 so that status of the request can be determined. A request can be accepted or rejected depending on the arbitration result.

The PDTRB circuit 220 receives the request information from the request storage 210 and snoops the requests from the pre-fetch side via the read transaction generator 265. The PDTRB circuit 220 obtains the corresponding data in the active set 245 based on the stream token from the stream router 240. Essentially, the PDTRB receives the feedback information from the pre-fetched transactions to regulate the processing of the current transactions.

The stream replacement processor 230 applies a replacement policy to generate a stream token in the stream queue 235. The stream token corresponds to an available slot in the active set 245. The slot tokens are generated by the stream replacement processor 230 at a rate R equal to the aggregate stream invalidation rate. Various rules determine when a stream context is invalidated, including master disconnect behavior, idle stream time-out policies, and buffer staleness. Preferably, the number of slot tokens available does not exceed the number of physical stream slots m. The stream queue 235 stores the slot tokens at a rate R. The stream queue 235 has a depth of S, which is the size of the queue. The stream router 240 routes the token to the appropriate location in the PDTRB circuit 220 according to the status of the PDTRB circuit 220.

The active set 245 is a set of active contexts and includes m elements 0 through (m-1). An active context refers to a situation when a slot is taken. These elements are data structures corresponding to the elements stored in the data buffer 250. The data structures are the target data to be read by the transaction.

The read stream pre-fetch engine 260 receives active stream information, outstanding expander packet information, and RAM buffer watermark and generate read pre-fetch requests to the read transaction generator 265. Initially, the initial expander request containing the original PCI address is known as the "demand" read request because it is a required read. Subsequent linearly addressed (e.g., contiguous) reads on behalf of the same read stream are known as read pre-fetch requests as generated by the read stream pre-fetch engine 260.

The read transaction generator 265 receives the read pre-fetch requests from the read stream pre-fetch engine 260 and new stream information by monitoring the active set 245 for new entries. The read transaction generator 265 creates a fixed request-size expander bus read packet and pushes it into the inbound expander bus transaction queue (EBTQ) 270 when a new entry is detected. The read transaction generator 265 may also push read pre-fetch packets into the EBTQ 270 if the read stream pre-fetch engine 260 so requests. The active stream register logic (not shown) is responsible for avoiding loading duplicate active stream entries during repeat retries by the same master. The EBTQ 270 stores the pre-fetch packets from the read transaction generator 265 and forward the packets to the chipset core components 275.

The chipset core components 275 forward the request to its destination, resulting on a read completion packet. The completion returns over the expander bus and enters the data buffer 250. The data buffer 250 is a RAM or a FIFO having a depth of n-1 and a width of m-1 that stores the read completion packet. The data buffer 250 stores the data until the requesting PCI master returns, or retries, for it. When the data buffer 250 contains valid data for s stream context and the stream register successfully matches to a request, the bridge chipset 120 begins streaming data to the master.

Figure 3:
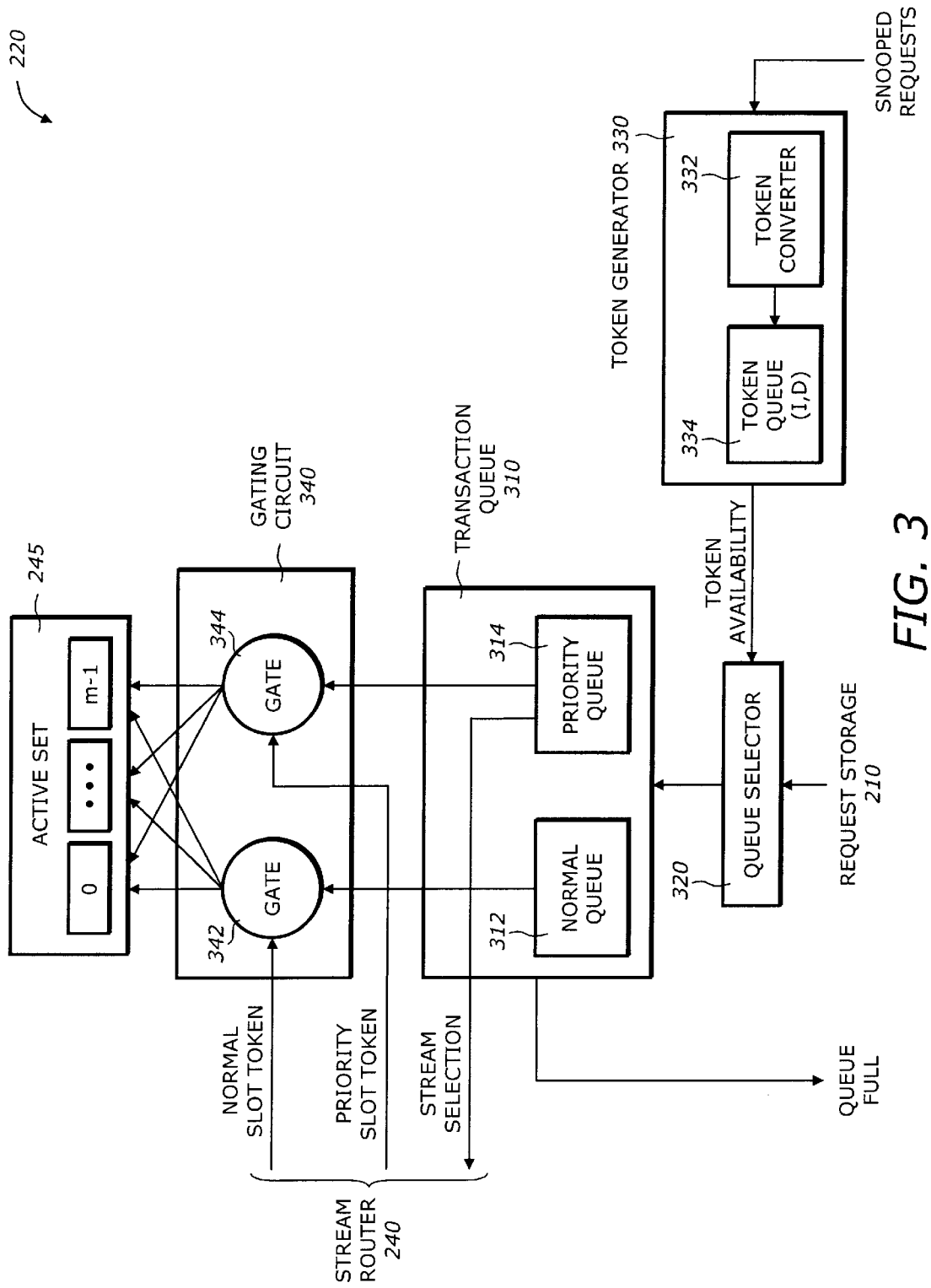
FIG. 3 is a diagram illustrating a prioritized delayed transaction reservation buffer circuit shown in FIG. 2 according to one embodiment of the invention.

FIG. 3 is a diagram illustrating the prioritized delayed transaction reservation buffer (PDTRB) circuit 220 shown in FIG. 2 according to one embodiment of the invention. The PDTRB circuit 220 includes a transaction queue 310, a queue selector 320, a token generator 330, and a gating circuit 340.

The transaction queue 310 stores a transaction request as forwarded by the queue selector 320. The transaction queue 310 issues a stream transaction for the stored transaction request when a stream slot becomes available in the active set 245. When an active stream context is invalidated or de-activated, it becomes an invalid stream context or a vacant slot. This vacant slot is available to be filled for the stream transaction. The transaction queue 310 generates a queue full flag to indicate that the queue is full and the request is rejected. The transaction queue 310 includes a normal queue 312 and a priority queue 314

The queue selector 310 selects either the normal queue 312 or the priority queue 314 to store the transaction request as received from the request storage 210. The queue selector 310 also receives a token availability indicator from the token generator 330. The token availability indicator indicates if there is a token available in the token generator 330. The queue selector 310 transfers the transaction request to the transaction queue 310 based on a selection condition.

The token generator 330 provides a token representative of a pre-fetched request. The token generator 330 includes a token converter 332 and a token queue 334. The token converter 334 snoops all read transactions that are pushed into the EBTQ 270 (FIG. 2) and converts the transactions into tokens according to the following rule. Any snooped request with a normal class results in a token conversion. The conversion rate may be one token per transaction or one token per normal data request quantum. For example, one token may be generated per memory-read-multiple (MRM) issued or one token per 64-byte normal request data quantum. In a system where memory reads (MRs) and memory read lines (MRLs) are typically 64 bytes, this conversion ratio generates about two 64-byte priority tokens per 128-byte MRM packet. The token queue 334 has a depth D and a replacement rate I. The replacement rate I is a function of the token conversion factor and the other active stream packet traffic. The token availability indicator indicates if there is any token in the token queue 334.

The gating circuit 340 gates the transaction request from the transaction queue 310 with the slot tokens provided by the stream router 240. The gating circuit 340 includes a normal gate 342 and a priority gate 344. If there is an available slot in the active stream context, a slot token is available. In other words, an available slot token indicates that an inactive read slot is available. The priority gate 344 allows a request from the priority queue 314 to obtain the available slot in the active set 245 if there is a valid entry in the priority queue 314. Otherwise, if there is a valid entry in the normal queue 312, the normal gate 342 allows a request from the normal queue 312 to obtain the available slot in the active stream context 245. The priority queue 314 generates a stream selector signal to indicate to the stream router 240 whether to route tokens to gate 342 or gate 344.

Figure 4:
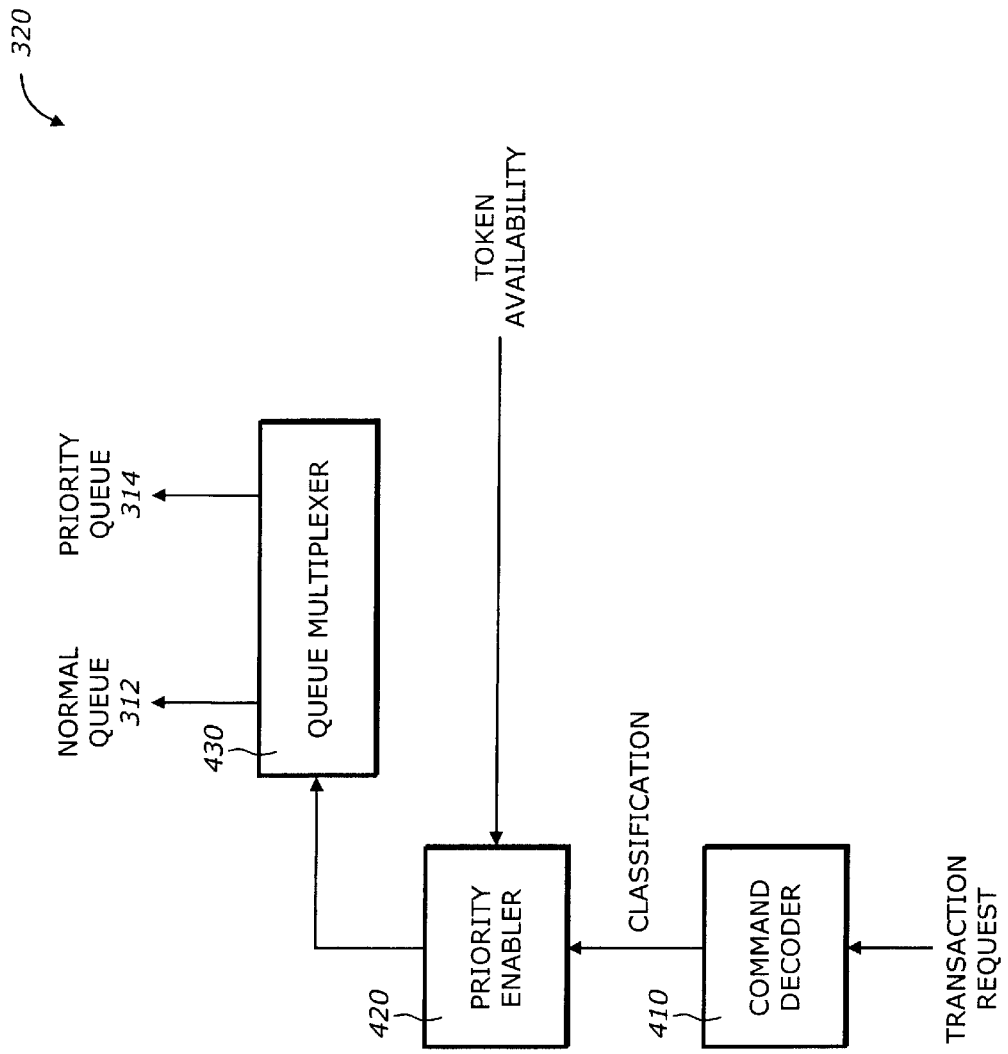
FIG. 4 is a diagram illustrating a queue selector shown in FIG. 3 according to one embodiment of the invention.

FIG. 4 is a diagram illustrating the queue selector 320 shown in FIG. 3 according to one embodiment of the invention. The queue selector 320 includes a command decoder 410, a priority enabler 420, and a queue multiplexer 430.

The command decoder 410 decodes the PCI request and classifies the request into a classification including a normal class and a priority class. The priority enabler 420 receives the classification and the token availability from the token generator 330 (FIG. 3). The queue multiplexer 430 receives the transaction request from the request storage 210 and forwards the transaction request to the normal or priority queue according to the selection condition. The selection condition is based on the classification of the request and the token availability. The selection condition is as follows. If the token availability indicator indicates that there is a token available in the token queue 332 (FIG. 3) and the classification is a priority class, then the request is pushed into the priority queue 314. Otherwise, the request is pushed into the normal queue 312.

The technique described above behaves well whether the priority classification is used regularly as part of real-time data (e.g., video, audio) hauling, or when the priority classification is used briefly and intermittently to fetch control information prior to large data transfers that utilize the normal classification. In the two scenarios, and for traffic mixtures in between, the technique adapts appropriately. The technique enforces class interleaving during heavy priority class utilization while storing up tokens for use in expediting priority transactions when such transactions are used at ratios lower than normal transactions at either one-for-one or any ratio depending on the token conversion.

The depth D of the token queue 334 (FIG. 3) limits the accumulation of priority-class tokens for burst scenarios. For example, if normal-class data streaming is in progress for several masters over a long period of time such as during a set of 4–8 Kilobyte (KB) transfers, the large number of normal request packets snooped by the token converter 332 (FIG. 3) will result in the token queue 334 being full. As the streams terminate and begin to initiate short control fetches, there will be D tokens to support priority handling. On the other hand, if three masters exist and one utilizes non-prefetchable read commands (e.g., MRLs or MRs) for data bursting through 4–8 KB worth of memory, any stored tokens quickly deplete. The master using these priority commands then experiences read throttling due to the token replacement rate I. Therefore, for a properly set conversion ratio, the priority class data hauling will be limited to a fair time-average share of the available read throughput.

Figure 5:
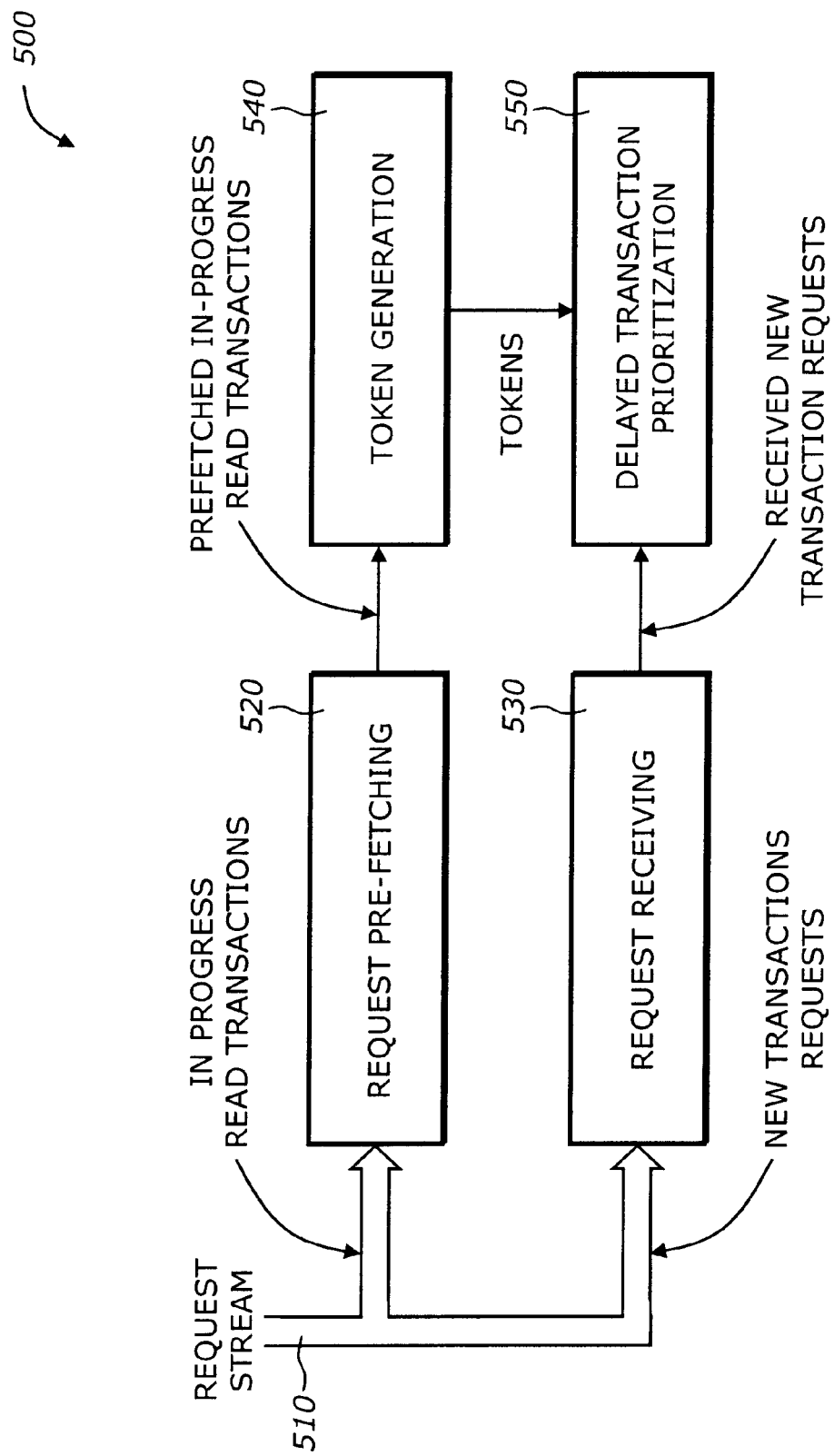
FIG. 5 is a diagram illustrating a data flow for processing transaction requests according to one embodiment of the invention.

FIG. 5 is a diagram illustrating a data flow 500 for processing transaction requests according to one embodiment of the invention. The data flow 500 includes a request stream 510, a request pre-fetching 520, a request receiving 530, a token generation 540, and a delayed transaction prioritization 550.

The request stream 510 includes stream of read transactions as generated by a PCI master. The request pre-fetching 520 pre-fetches the in-progress read transactions. The request receiving 530 receives new transaction requests from the bus interface. The token generation 540 generates the tokens from the snooped requests provided by the request pre-fetching 520. The delayed transaction prioritization 550 prioritizes the transaction based on the token generated by the token generation 540 and the classification of the transaction request as provided by the request receiving 530.

The data flow 500 shows the concurrent processes between the pre-fetching 520, the token generation 540 and the request receiving 530 and the delayed transactions prioritization 550. The feedback information provided by the pre-fetching 520 and token generation 540 is used to regulate the current transaction requests.

Figure 6:
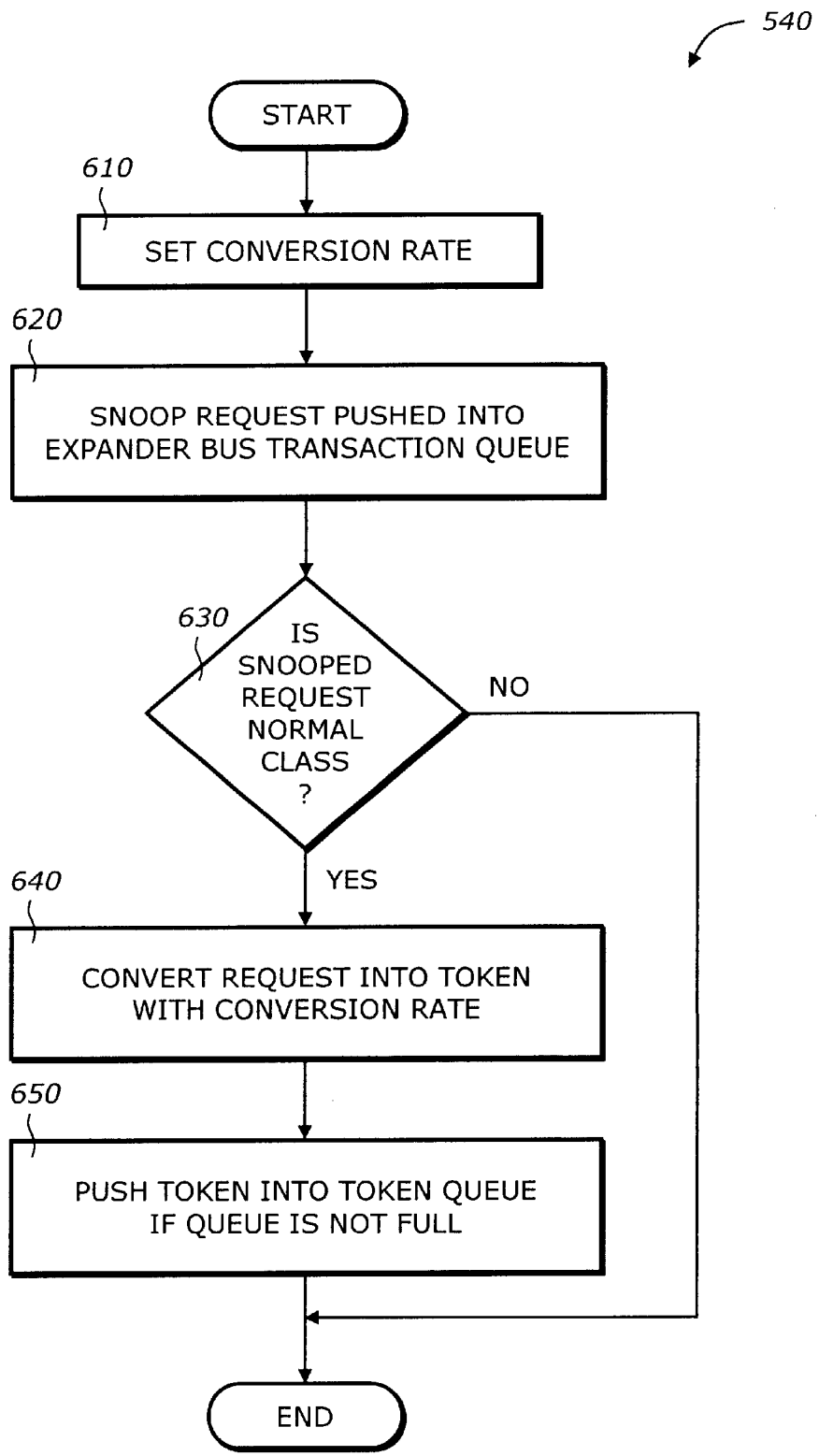
FIG. 6 is a flowchart illustrating a process to generate tokens according to one embodiment of the invention.

FIG. 6 is a flowchart illustrating the process 540 to generate tokens according to one embodiment of the invention.

Upon START, the process 540 sets the conversion rate for the token converter (Block 610). Then, the process 540 snoops the requests that are pushed into the expander bus transaction queue (EBTQ) (Block 620). Next, the process 540 determines if the snooped request is a normal class (Block 630).

If the snooped request is a priority class, the process 540 does not generate a token and is terminated. If the snooped request is a normal class, the process 540 converts the request into a token according to the conversion rate set earlier (Block 640). Then the process 540 pushes the generated token into the token queue and sets the token availability indicator accordingly (Block 650). The process 540 is then terminated.

Figure 7:
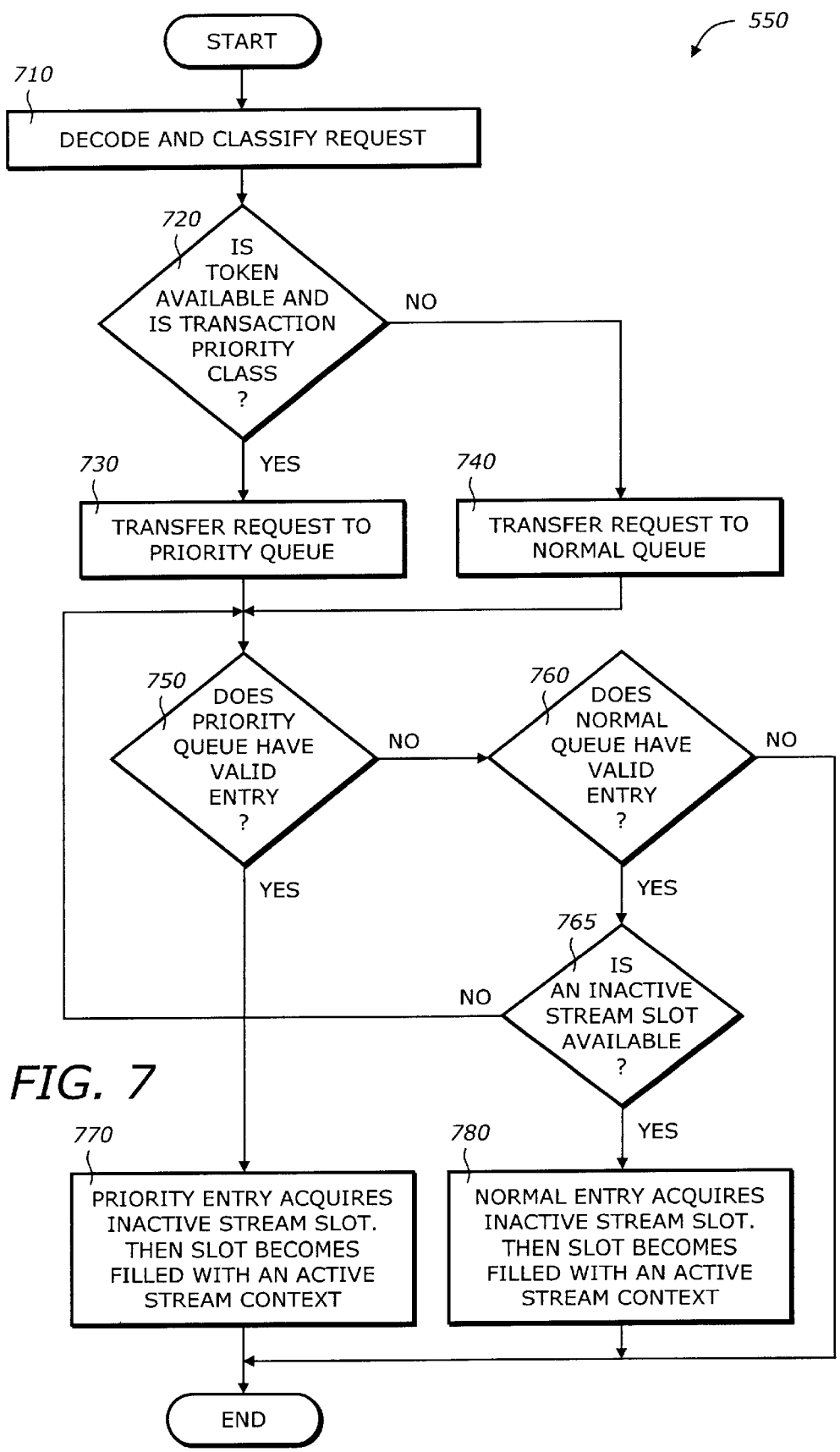
FIG. 7 is a flowchart illustrating a process to prioritize the delayed transactions according to one embodiment of the invention.

FIG. 7 is a flowchart illustrating the process 550 to prioritize the delayed transactions according to one embodiment of the invention.

Upon START, the process 550 decodes and classifies the transaction request (Block 710). The classification results in a normal class and a priority class. Then, the process 550 determines if there is any available token and if the transaction is a priority class (Block 720). If so, the process 550 transfers the request to the priority queue (Block 730). Otherwise, the process 550 transfers the request to the normal queue (Block 740).

Next, the process 550 determines if the priority queue has a valid entry (Block 750). If so, the priority entry acquires an inactive stream slot, which becomes filled with an active stream context (Block 770), and the process 550 is terminated. Otherwise, the process 550 determines if the normal queue has a valid entry (Block 760). If so, the process 550 determines if an inactive stream slot is available (Block 765). If an inactive stream slot is available, the normal entry acquires an inactive stream slot, which becomes filled with an active stream context (Block 780), and the process 550 is terminated. If an inactive stream slot is not available, the process 550 goes to Block 750 to determine if a priority valid entry may arrive, which will override the normal entry. If there is no late arriving priority valid entry, the process 550 will continue checking for an available stream slot via block 765. If the normal queue does not have a valid entry, the process 550 is terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a transaction queue to store a transaction request, the transaction queue issuing a stream transaction for the stored transaction request when a slot in a set of active stream contexts becomes available;
    a token generator to provide a token representative of a pre-fetched request; and
    a queue selector coupled to the transaction queue and the token generator to transfer the transaction request to the transaction queue based on a selection condition.

2. The apparatus of claim 1 wherein the selection condition includes a token availability in the token generator and a classification of the transaction request.

3. The apparatus of claim 2 wherein the classification includes a normal class and a priority class.

4. The apparatus of claim 3 wherein the transaction queue comprises:
    a normal queue to store the transaction request when the token availability does not occur or the classification is the normal class; and
    a priority queue to store the transaction request when the token availability occurs and the classification is the priority class.

5. The apparatus of claim 4 wherein the token generator comprises:
    a token converter coupled to a transaction generator to convert the pre-fetched request to the token according to the classification; and
    a token queue coupled to the token converter and the queue selector to store the token, the token queue causing the token availability.

6. The apparatus of claim 5 wherein the queue selector comprises:
    a multiplexer coupled to transaction queue to forward the transaction request to one of the normal and priority queues according to the selection condition;
    a priority enabler to generate the selection condition based on the classification and the token availability; and
    a command decoder to decode the transaction request into the classification.

7. The apparatus of claim 6 wherein the token converter generates the token when the classification is a normal class.

8. The apparatus of claim 7 wherein the token converter does not generate the token when the classification is a priority class.

9. The apparatus of claim 8 wherein the stream transaction corresponds to the transaction request stored in the priority queue.

10. The apparatus of claim 8 wherein the stream transaction corresponds to the transaction request stored in the normal queue when the priority queue is empty.

11. A method comprising:
issuing a stream transaction for a transaction request when a slot in a set of active stream contexts becomes available, the transaction request being stored in a transaction queue;
providing a token representative of a pre-fetched request; and
transferring the transaction request to the transaction queue based on a selection condition.

12. The method of claim 11 wherein the selection condition includes a token availability in the token generator and a classification of the transaction request.

13. The method of claim 12 wherein the classification includes a normal class and a priority class.

14. The method of claim 13 wherein issuing the stream transaction comprises:
storing the transaction request in a normal queue when the token availability does not occur or the classification is the normal class; and
storing the transaction request in a priority queue when the token availability occurs and the classification is the priority class.

15. The method of claim 14 wherein providing the token comprises:
converting the pre-fetched request to the token according to the classification; and
storing the token in a token queue, the token queue causing the token availability.

16. The method of claim 15 wherein transferring the transaction request comprises:
forwarding the transaction request to one of the normal and priority queues according to the selection condition;
generating the selection condition based on the classification and the token availability; and
decoding the transaction request into the classification.

17. The method of claim 16 wherein converting the pre-fetched request comprises generating the token when the classification is a normal class.

18. The method of claim 17 wherein converting the pre-fetched request comprises not generating the token when the classification is a priority class.

19. The method of claim 18 wherein the stream transaction corresponds to the transaction request stored in the priority queue.

20. The method of claim 18 wherein the stream transaction corresponds to the transaction request stored in the normal queue when the priority queue is empty.

21. A computer program product comprising
a computer readable medium having a computer program code embedded therein, the computer program product comprising:
machine-readable program code to issue a stream transaction for a transaction request when a slot in a set of active stream contexts becomes available, the transaction request being stored in a transaction queue;
machine-readable program code to provide a token representative of a pre-fetched request; and
machine-readable program code to transfer the transaction request to the transaction queue based on a selection condition.

22. The computer program product of claim 21 wherein the selection condition includes a token availability in the token generator and a classification of the transaction request.

23. The computer program product of claim 22 wherein the classification includes a normal class and a priority class.

24. The computer program product of claim 23 wherein the machine-readable program code to issue the stream transaction comprises:
machine-readable program code to store the transaction request in a normal queue when the token availability does not occur or the classification is the normal class; and
machine-readable program code to store the transaction request in a priority queue when the token availability occurs and the classification is the priority class.

25. The computer program product of claim 24 wherein the machine-readable program code to provide the token comprises:
machine-readable program code to convert the pre-fetched request to the token according to the classification; and
machine-readable program code to store the token in a token queue, the token queue causing the token availability.

26. The computer program product of claim 25 wherein the machine-readable program code to transfer the transaction request comprises:
machine-readable program code to forward the transaction request to one of the normal and priority queues according to the selection condition;
machine-readable program code to generate the selection condition based on the classification and the token availability; and
machine-readable program code to decode the transaction request into the classification.

27. The computer program product of claim 26 wherein converting the pre-fetched request comprises generating the token when the classification is a normal class.

28. The computer program product of claim 27 wherein the machine-readable program code to convert the pre-fetched request comprises machine-readable program code to not generate the token when the classification is a priority class.

29. The computer program product of claim 28 wherein the stream transaction corresponds to the transaction request stored in the priority queue.

30. The computer program product of claim 28 wherein the stream transaction corresponds to the transaction request stored in the normal queue when the priority queue is empty.

31. A chipset comprising:
a pre-fetch engine to pre-fetch a read stream;
a transaction generator coupled to the pre-fetch engine to generate a pre-fetched request from the read stream; and
a prioritized delayed transaction reservation buffer (PDTRB) circuit coupled to the transaction generator to prioritize a transaction request, the PDTRB circuit comprising:
a transaction queue to store the transaction request, the transaction queue issuing a stream transaction for the stored transaction request when a slot in a set of active stream contexts becomes available, a token generator to provide a token representative of the pre-fetched request, and a queue selector coupled to the transaction queue and the token generator to transfer the transaction request to the transaction queue based on a selection condition.

32. The chipset of claim 31 wherein the selection condition includes a token availability in the token generator and a classification of the transaction request.

33. The chipset of claim 32 wherein the classification includes a normal class and a priority class.

34. The chipset of claim 33 wherein the transaction queue comprises:

a normal queue to store the transaction request when the token availability does not occur or the classification is the normal class; and a priority queue to store the transaction request when the token availability occurs and the classification is the priority class.

35. The chipset of claim 34 wherein the token generator comprises:

a token converter coupled to a transaction generator to convert the pre-fetched request to the token according to the classification; and a token queue coupled to the token converter and the queue selector to store the token, the token queue causing the token availability.

36. The chipset of claim 35 wherein the queue selector comprises:

a multiplexer coupled to transaction queue to forward the transaction request to one of the normal and priority queues according to the selection condition;

a priority enabler to generate the selection condition based on the classification and the token availability; and a command decoder to decode the transaction request into the classification.

37. The chipset of claim 36 wherein the token converter generates the token when the classification is a normal class.

38. The chipset of claim 37 wherein the token converter does not generate the token when the classification is a priority class.

39. The chipset of claim 38 wherein the stream transaction corresponds to the transaction request stored in the priority queue.

40. The chipset of claim 38 wherein the stream transaction corresponds to the transaction request stored in the normal queue when the priority queue is empty.

* * * * *